United States Patent
Fu et al.

(10) Patent No.: US 12,039,124 B2
(45) Date of Patent: Jul. 16, 2024

(54) TOUCH DEVICE FOR PAIRING WITH STYLUS AND CONTROL SYSTEM USING THE TOUCH DEVICE

(71) Applicant: ELAN MICROELECTRONICS CORPORATION, Hsin-Chu (TW)

(72) Inventors: Chuan-Yen Fu, Nantou County (TW); You-Chi Chen, Hsinchu (TW); Ting-Hsuan Cheng, New Taipei (TW)

(73) Assignee: ELAN MICROELECTRONICS CORPORATION, Hsin-Chu (TW)

(*) Notice: Subject to any disclaimer, the term of this patent is extended or adjusted under 35 U.S.C. 154(b) by 0 days.

(21) Appl. No.: 17/965,493

(22) Filed: Oct. 13, 2022

(65) Prior Publication Data
US 2023/0244340 A1      Aug. 3, 2023

(30) Foreign Application Priority Data
Jan. 28, 2022   (TW) .................................. 111104195

(51) Int. Cl.
*G06F 3/041* (2006.01)
*G06F 3/033* (2013.01)
*G06F 3/0354* (2013.01)

(52) U.S. Cl.
CPC ...... *G06F 3/04162* (2019.05); *G06F 3/04164* (2019.05); *G06F 3/033* (2013.01); *G06F 3/03545* (2013.01); *G06F 2203/04112* (2013.01)

(58) Field of Classification Search
CPC .. G06F 3/04162; G06F 3/04164; G06F 3/033; G06F 3/03545; G06F 2203/04112
See application file for complete search history.

(56) References Cited

U.S. PATENT DOCUMENTS

| | | | |
|---|---|---|---|
| 2012/0050201 A1 | 3/2012 | Nozawa | |
| 2019/0187496 A1 | 6/2019 | Lee et al. | |
| 2020/0042118 A1* | 2/2020 | Mugiraneza | G06F 3/0446 |
| 2022/0019327 A1* | 1/2022 | So | G06F 3/04162 |

FOREIGN PATENT DOCUMENTS

| | | |
|---|---|---|
| JP | 20113049 A | 1/2011 |
| TW | 201642100 A | 12/2016 |

OTHER PUBLICATIONS

An Office Action in corresponding TW Application No. 111104195 dated Feb. 24, 2023 is attached, 7 pages.

* cited by examiner

*Primary Examiner* — Lisa S Landis
(74) *Attorney, Agent, or Firm* — MUNCY, GEISSLER, OLDS & LOWE, P.C.

(57) ABSTRACT

A touch device includes a substrate, a touch sensor and an auxiliary electrode configuration. The touch sensor is located on the upper surface of the substrate. The auxiliary electrode configuration is located outside the touch sensor and is used to transmit an uplink signal.

25 Claims, 9 Drawing Sheets

TOUCH DEVICE FOR PAIRING WITH STYLUS AND CONTROL SYSTEM USING THE TOUCH DEVICE

This application claims priority of Application No. 111104195 filed in Taiwan on 28 Jan. 2022 under 35 U.S.C. § 119; the entire contents of all of which are hereby incorporated by reference.

BACKGROUND OF THE INVENTION

Field of the Invention

The present invention relates to an input device, particularly to a touch device and a control system using the touch device.

Description of the Related Art

FIG. 1 shows a touch device 10. The touch device 10 includes a touch sensor 102 and a bezel 104. The touch sensor 102 is configured to detect the location of an active stylus 20. The bezel 104 surrounds the touch sensor 102. The stylus 20 can write on the touch device 10 so that a display 12 shows the handwriting 14. Before the active stylus 20 executes a writing operation on the touch device 10, the touch device 10 and the stylus 20 need to be paired first. The pairing steps include: (1) the touch sensor 102 transmitting an uplink signal; (2) the stylus 20 transmitting a downlink signal after receiving the uplink signal; and (3) the touch sensor 102 receiving the downlink signal to complete pairing the touch device 10 with the stylus 20. After the pairing steps are completed, the stylus 20 continues transmitting downlink signals to the touch sensor 102, so that the touch device 10 can detect the location of the stylus 20 to display the trajectory of the stylus 20.

In the existing technology, when a user uses the stylus 20 to move from the bezel 104 to the touch sensor 102, the handwriting is shown as the handwriting 14 on the display 12 in FIG. 1. There is a blank space BS between the handwriting 14 and the edge of the display 12, which is not what the user intends to see.

The reason for the blank space BS is that it takes a period of time to obtain the location of the stylus 20 after the touch device 10 is paired with the stylus 20. As shown in FIG. 1, during the movement of the stylus 20, the stylus 20 receives the uplink signal at position A close to the touch sensor 102, and pairs with the touch device 10 at position B. After the stylus 20 is paired with the touch device 10, it takes a period of time for the stylus 20 to transmit the downlink signal again. For example, the stylus 20 retransmits the downlink signal at position C. Therefore, the touch device 10 starts to obtain the location of the stylus 20 at position C. The resulting handwriting 14 will be shown by the display 12.

On the other hand, if the user's finger touches the touch sensor 102, the uplink signal may be disturbed by the finger and thus weakened. In this case, the stylus 20 needs to be closer to the touch sensor 102 in order to receive the uplink signal, which means that the stylus 20 and the touch device 10 will take more time to complete the pairing steps, and the blank space BS will be enlarged accordingly.

SUMMARY OF THE INVENTION

One objective of the present invention is to provide a touch device with an auxiliary electrode configuration.

One objective of the present invention is to provide a control system using a touch device with an auxiliary electrode configuration.

According to the present invention, a touch device includes a substrate, a touch sensor, and an auxiliary electrode configuration. The touch sensor is located on the upper surface of the substrate. The auxiliary electrode configuration is located outside the touch sensor and configured to transmit an uplink signal. The auxiliary electrode configuration can effectively reduce the blank space stated in prior art.

According to the present invention, a control system includes a touch device and a control device. The touch device includes a substrate, a touch sensor, a bezel, and an auxiliary electrode configuration. The touch sensor is located on the upper surface of the substrate. The bezel surrounds the touch sensor and allows an uplink signal to pass. The auxiliary electrode configuration is located outside the touch sensor, covered by the bezel, and configured to transmit the uplink signal. The control device is fastened with the bezel. The control device activates a communication function to communicate with the touch device when receiving the uplink signal. With the auxiliary electrode configuration, the communication quality between the touch device and the control device can be more stable.

Below, the embodiments are described in detail in cooperation with the drawings to make easily understood the technical contents, characteristics and accomplishments of the present invention.

DETAILED DESCRIPTION OF THE INVENTION

Figure 1:
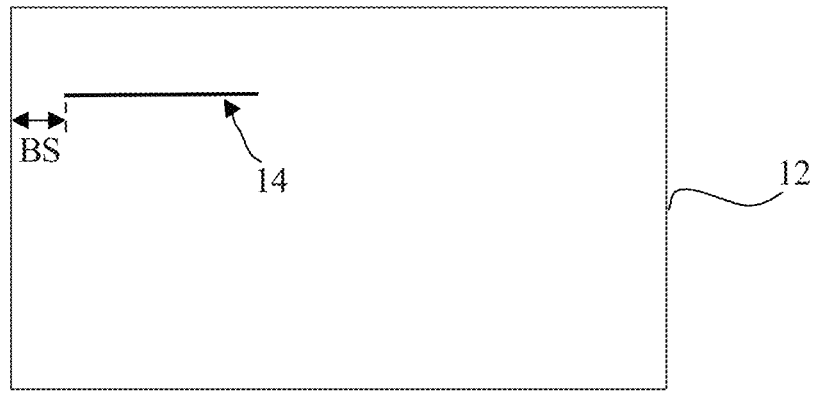
FIG. 1 shows a conventional touch device.
Figure 1:
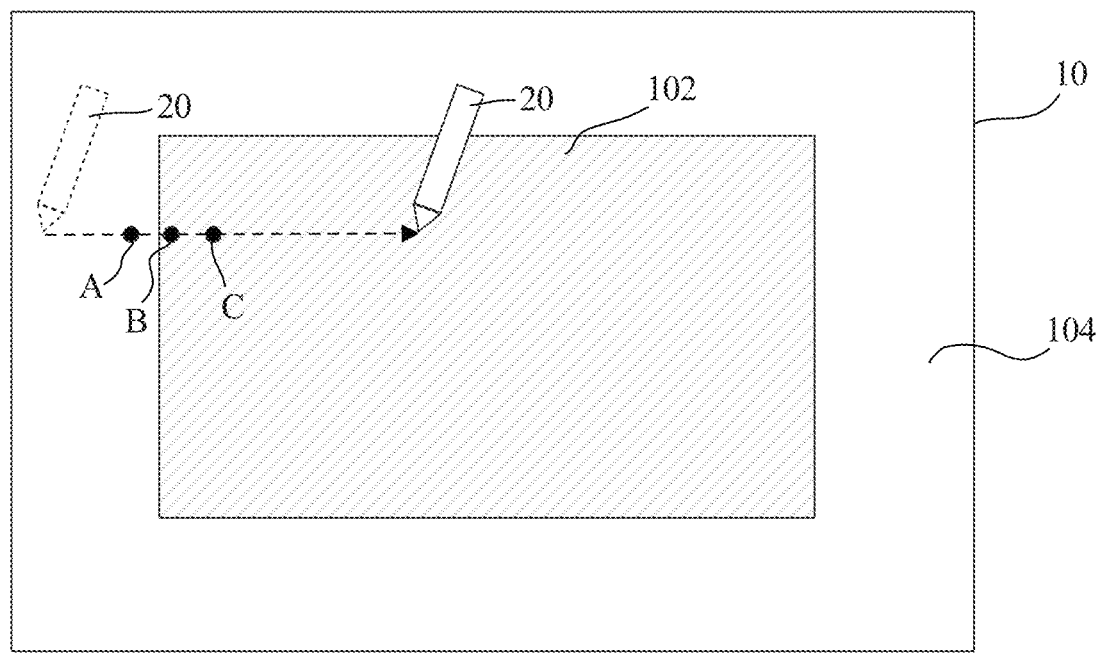

The present invention arranges an auxiliary electrode configuration under a bezel 104 in FIG. 1. The auxiliary electrode configuration is covered by the bezel 104 rather than exposed outside the bezel 104. The auxiliary electrode configuration includes one or more electrodes. The present invention uses the auxiliary electrode configuration to emit an uplink signal. The bezel allows the uplink signal to pass. When a stylus moves from around a touch device to the touch device, the present invention can help the stylus and the touch device to complete the pairing earlier. FIGS. 2-8 are used to illustrate various embodiments of the touch device of the present invention. For brevity, the bezel is omitted in the drawings. However, the appearance of the touch device shown in each figure is substantially the same as that of a touch device 10 in FIG. 1.

Figure 2:
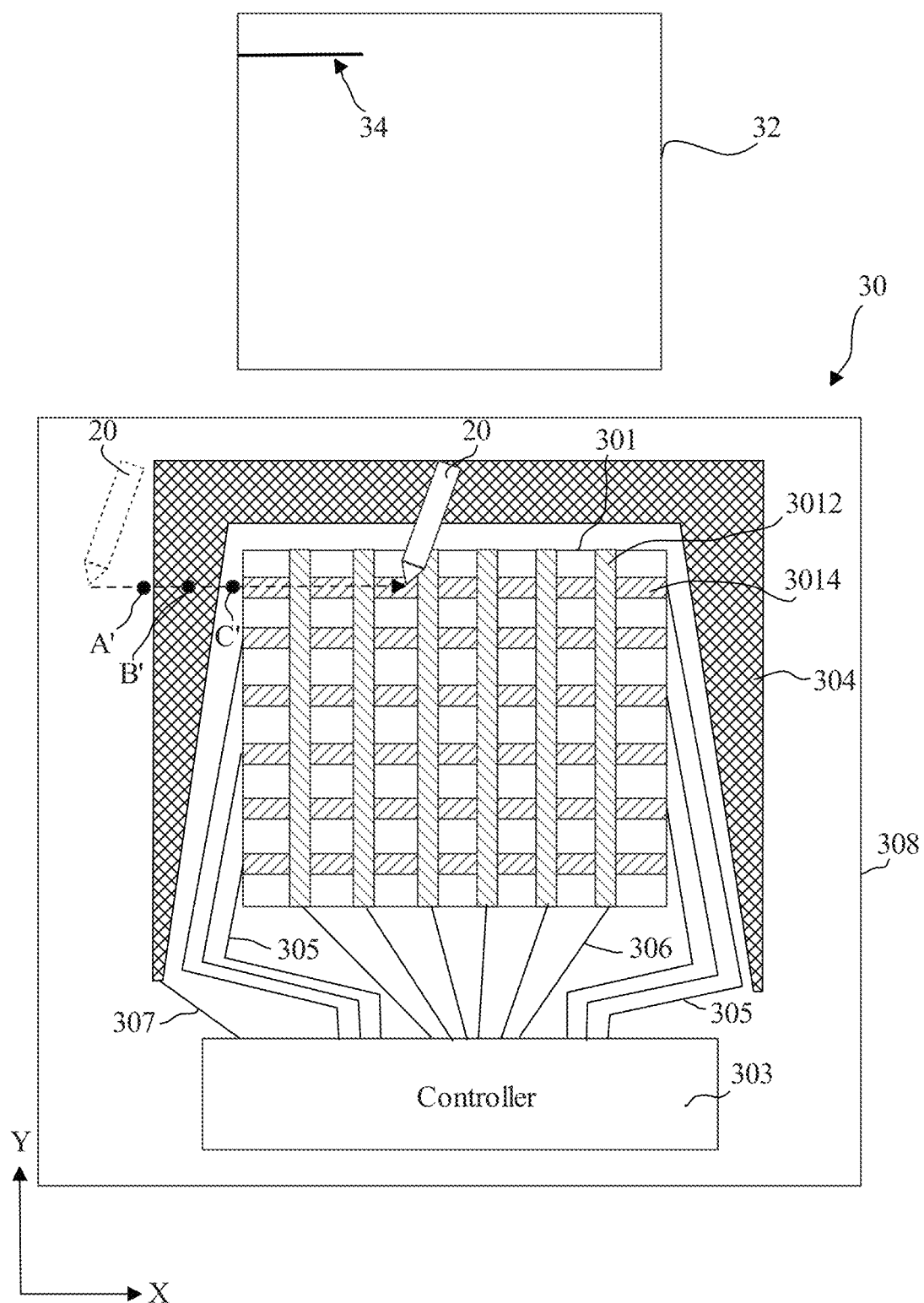
FIG. 2 shows a first embodiment of a touch device of the present invention.

FIG. 2 shows a first embodiment of a touch device of the present invention. In FIG. 2, the auxiliary electrode configuration includes an electrode 304. A touch device 30 includes a touch sensor 301, a controller 303, the electrode 304, a plurality of traces 305~307, and a substrate 308. The controller 303, the electrodes 304, the plurality of traces 305~307 and the periphery of the substrate 308 are all located under a bezel (not shown). The touch sensor 301, the electrode 304, and the plurality of traces 305~307 are located on the upper surface of the substrate 308. The controller 303 may be located on the upper surface or the lower surface of the substrate 308. In one embodiment, the touch sensor 301 can be overlapped and integrated with a display 32 to form a touch screen.

The touch sensor 301 has a plurality of first sensing electrodes 3012 and a plurality of second sensing electrodes 3014. The first sensing electrodes 3012 and the second sensing electrodes 3014 are configured to sense the location of an active stylus 20. The plurality of first sensing electrodes 3012 are arranged in parallel along the X direction. The plurality of second sensing electrodes 3014 are arranged in parallel along the Y direction. The controller 303 is coupled to the plurality of first sensing electrodes 3012 through the plurality of traces 306. The controller 303 is coupled to the plurality of second sensing electrodes 3014 through the plurality of traces 305. The electrode 304 is coupled to the controller 303 through the trace 307. The electrode 304 extends along the upper side, the left side, and the right side of the touch sensor 301 to surround the touch sensor 301. The controller 301 controls the electrode 304 and at least one of the plurality of sensing electrodes 3012 and 3014 to simultaneously transmit uplink signal. In other embodiments, the controller 301 may control the electrode 304 and at least one of the plurality of sensing electrodes 3012 and 3014 to transmit uplink signal at different time. The plurality of first sensing electrodes 3012, the plurality of second sensing electrodes 3014, and the electrode 304 may be configured to receive downlink signals from the stylus 20. In FIG. 2, the plurality of traces 305 are coupled to the plurality of second sensing electrode 3014 from the left side and the right side of the touch sensor 301. The plurality of traces 306 are coupled to the plurality of first sensing electrode 3012 from the lower side of the touch sensor 301. In order to dodge the plurality of traces 305, each of two parts of the electrode 304 on the left side and the right side of the touch sensor 301 has a shape that is narrower at a lower side thereof and wider at an upper side thereof. The width of the electrode 304 may be designed according to the width of the bezel. In an embodiment, the electrode 304 has a width of 125~175 μm.

According to the arrangement of FIG. 2, the electrode 304 may transmit the uplink signal. When the stylus 20 moves from the left side of the bezel to the touch sensor 301, the stylus 20 can receive the uplink signal at position A' close to the electrode 304. As a result, the stylus 20 can be paired with the touch device 30 in advance at position B' and the position of the stylus 20 is obtained at position C'. According to the present invention, the foregoing movement of the stylus 20 causes the handwriting 34 on the display 32 without the blank space BS shown in FIG. 1. Thus, the user desired line is obtained.

When the finger or a part of the hand of the user touches the touch sensor 301 without touching the bezel, the uplink signal transmitted by the electrode 304 will not be disturbed to affect the pairing of the stylus 20 and the touch device 30.

Figure 3:
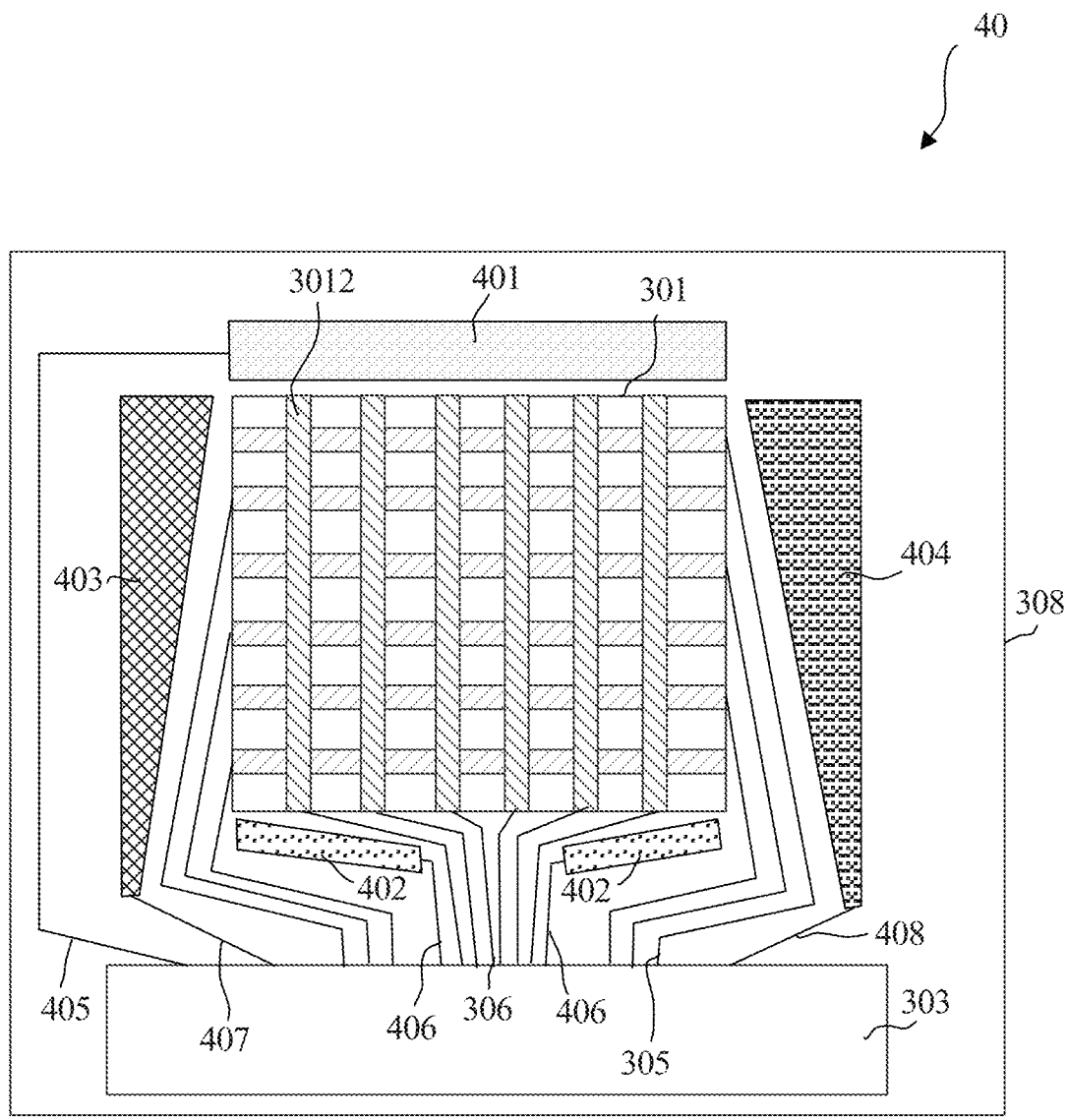
FIG. 3 shows a second embodiment of a touch device of the present invention.

FIG. 3 shows a second embodiment of a touch device of the present invention. FIG. 3 is different from FIG. 2 in that the auxiliary electrode configuration of a touch device 40 includes electrodes 401, 402, 403, and 404. The touch sensor 301, the electrodes 401~404, a plurality of traces 305~306, and a plurality of traces 405~408 are located on the upper surface of the substrate 308. The electrode 401, located outside the upper side of the touch sensor 301, extends along the edge of the upper side of the touch sensor 301. The two electrodes 402 are located between the touch sensor 301 and the controller 303. Each electrode 402 is located between the plurality of traces 305 and the plurality of traces 306. The two electrodes 402 extend to two ends of the lower side of the touch sensor 301. The electrode 403, located outside the left side of the touch sensor 301, extends along the edge of the left side of the touch sensor 301. The electrode 404, located outside the right side of the touch sensor 301, extends along the edge of the right side of the touch sensor 301. Each of the electrodes 403 and 404 has a shape that is narrower at a lower side thereof and wider at an upper side thereof. The electrodes 401~404 are respectively coupled to the controller 303 through the traces 405, 406, 407, and 408. The electrodes 401~404 may be configured to transmit uplink signals and/or receive downlink signals. In an embodiment, the controller 303 simultaneously transmits uplink signals to the electrodes 401~404 and at least one of the plurality of sensing electrodes 3012 and 3014 during a period P1. During a period P2 different from the period P1, the electrodes 401~404 and the touch sensor 301 are configured to receive downlink signals. The controller 303 computes the coordinates of the stylus 20 according to the sensing values of the electrodes 401~404 and the touch sensor 301. For example, if FIG. 3 lacks the electrode 403, the controller 303 will only obtain the sensing value of the leftmost sensing electrode 3012 of the touch sensor 301. Thus, the leftmost coordinates which the controller 303 can compute are the location of the leftmost sensing electrode 3012 of the touch sensor 301. With the added electrode 403 of the present invention, the controller 303 can obtain the sensing values of the electrodes 403 and the plurality of sensing electrodes 3012 of the touch sensor 301 to compute the coordinates closer to the edge of the left side of the touch sensor 301.

In an embodiment, when the electrodes 401~404 are configured to receive downlink signals, the controller 303 can determine that the stylus 20 moves from which side of the bezel to the touch sensor 301 according to the sensing values of the electrodes 401~404. For example, when the controller 303 detects that the electrode 401 has a sensing value, the controller 303 determines that the stylus 20 is close to the upper side of the touch sensor 301 and selects at least one sensing electrode close to the upper side to transmit the uplink signal. The widths of the electrodes 401~404 may be designed according to the width of the bezel. In an embodiment, each of the electrodes 401~404 has a width of 125~175 μm.

Figure 4:
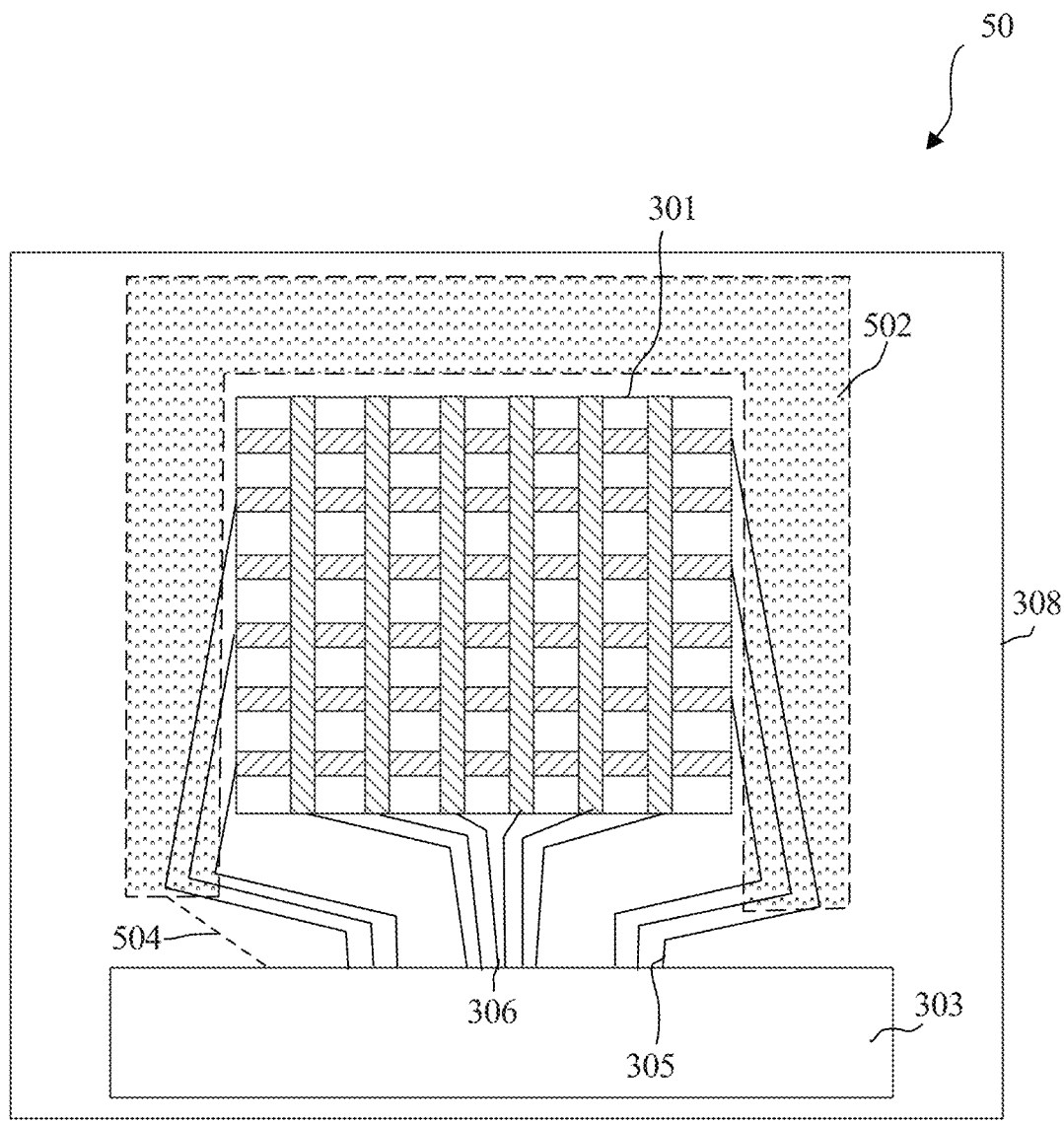
FIG. 4 shows a third embodiment of a touch device of the present invention.

FIG. 4 shows a third embodiment of a touch device of the present invention. A touch device 50 of FIG. 4 is different from the touch device of FIG. 2 in that the auxiliary electrode configuration includes an electrode 502 located on the lower surface of the substrate 308. The touch sensor 301 and the plurality of traces 305 and 306 are located on the upper surface of the substrate 308. The electrode 502 is coupled to the controller 303 through a trace 504. The electrode 502 extends along the upper side, the left side, and the right side of the touch sensor 301 to surround the touch sensor 301. The parts of the electrode 502 on the left side and the right side of the touch sensor 301 overlap the plurality of traces 305, which is helpful in reducing the width of the bezel. In an embodiment, the electrode 502 has a uniform width. The width of the electrode 502 may be designed according to the width of the bezel. In an embodiment, the electrode 502 has a width of 125~175 μm. The function and control of the electrode 502 may refer to the related description of the electrode 304, which will not be described in detail here.

In FIG. 4, the electrode 502 and the trace 504 are drawn with dashed lines to represent them on the lower surface of substrate 308. The substrate 308 includes two conduction layers. The conduction layer close to the upper surface is used to form the touch sensor 301 and the plurality of traces 305 and 306, and the conduction layer close to the lower surface is used to form the electrode 502 and the trace 504.

Figure 5:
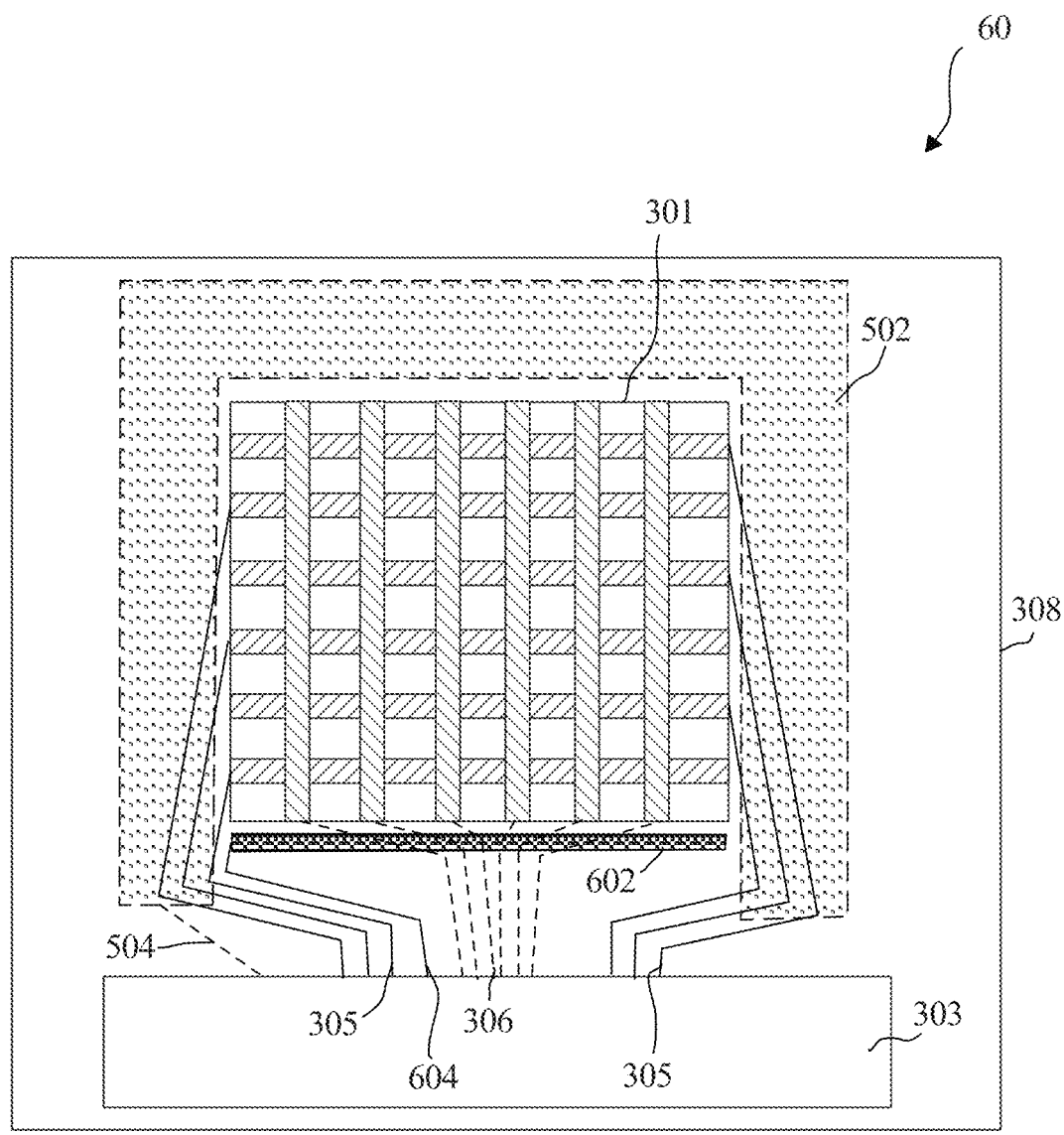
FIG. 5 shows a fourth embodiment of a touch device of the present invention.

FIG. 5 shows a fourth embodiment of a touch device of the present invention. A touch device 60 of FIG. 5 is different from the touch device of FIG. 4 in that the auxiliary electrode configuration of the touch device 60 further includes an electrode 602 located outside the lower side of the touch sensor 301. The electrode 602 is located on the upper surface of the substrate 308 and located between the touch sensor 301 and the controller 303. The plurality of traces 306 are located on the lower surface of the substrate 308. The electrode 602, overlapping the plurality of traces 306, is electrically disconnected from the plurality of traces 306. The electrode 602 is coupled to the controller 303 through a trace 604. In an embodiment, a metal mesh is formed between the touch sensor 301 and the controller 303. The metal mesh and the touch sensor 301 are located on the upper surface of the substrate 308 and implemented with the same conduction layer. A part of the metal mesh forms the electrode 602, and another part of the metal mesh is coupled to a grounding terminal. The electrodes 502 and 602 may be configured to transmit uplink signals and/or receive downlink signals. The width of the electrode 602 may be designed according to the width of the bezel. In an embodiment, the electrode 602 has a width of 125~175 μm. In an embodiment, the controller 303 simultaneously transmits uplink signals to the electrodes 502 and 602 and at least one of the sensing electrodes 3012 and 3014 during a period P1. During a period P2 different from the period P1, the electrodes 502 and 602 and the touch sensor 301 are configured to receive downlink signals. When the electrodes 502 and 602 receive the downlink signals, the controller 303 can determine that the stylus 20 moves from which side of the bezel to the touch sensor 301 according to the sensing values of the electrodes 502 and 602. For example, when the controller 303 detects that the electrode 602 has a sensing value, the controller 303 determines that the stylus 20 is close to the lower side of the touch sensor 301 and selects at least one sensing electrode close to the lower side to transmit the uplink signal. When the controller 303 detects that the electrode 502 has a sensing value, the controller 303 determines that the stylus 20 is close to the upper side, the left side, or the right side of the touch sensor 301.

Figure 6:
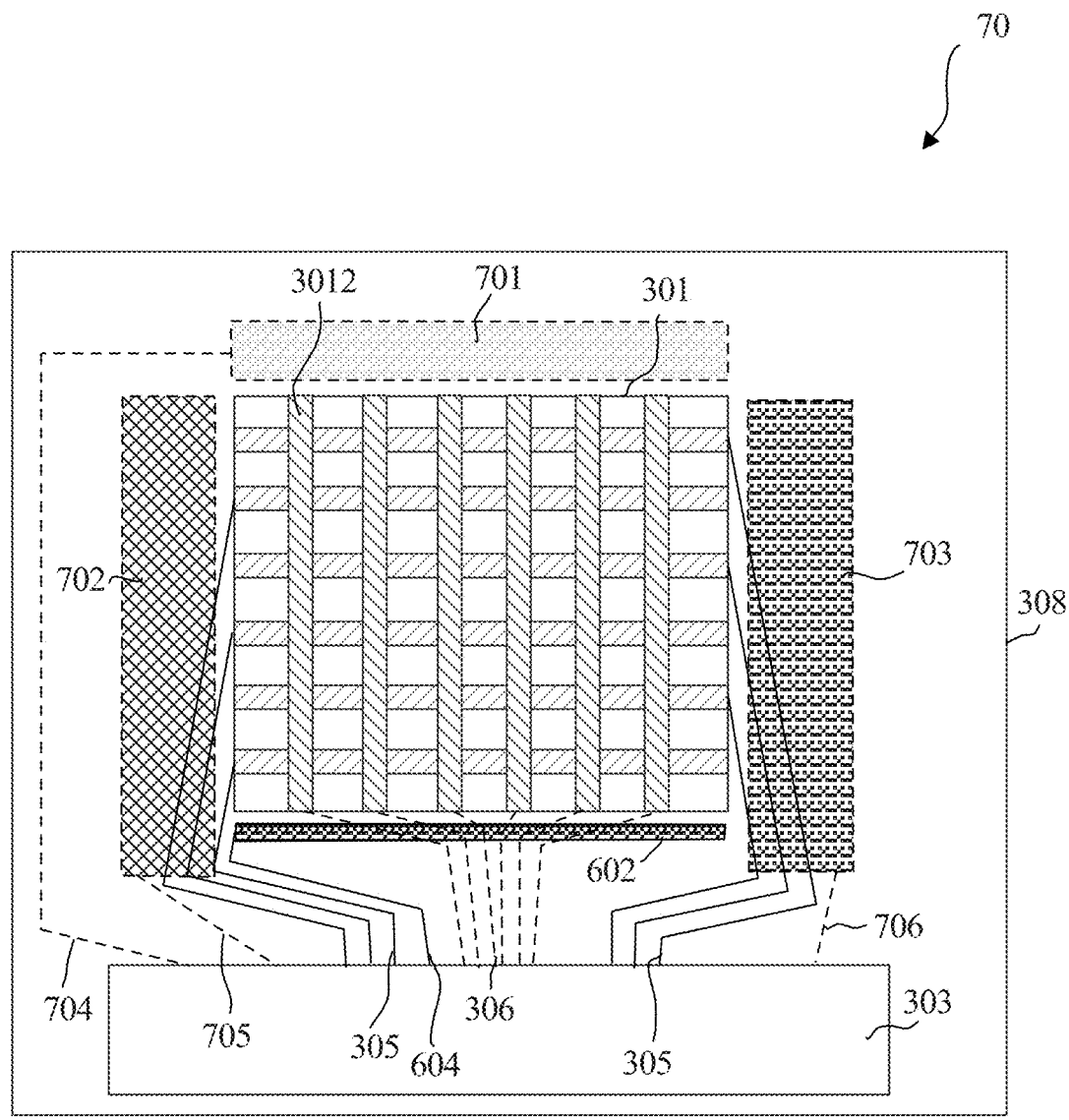
FIG. 6 shows a fifth embodiment of a touch device of the present invention.

FIG. 6 shows a fifth embodiment of a touch device of the present invention. A touch device 70 of FIG. 6 is different from the touch device of FIG. 5 in that the auxiliary electrode configuration of the touch device 70 includes electrodes 701, 702, and 703 and the electrode 602. The electrodes 701~703 are located on the lower surface of the substrate 308. The electrode 602 is located on the upper surface of the substrate 308. The electrodes 701~703 and the electrode 602 are respectively coupled to the controller 303 through traces 704~706 and the trace 604. The electrode 701, located outside the upper side of the touch sensor 301, extends along the edge of the upper side of the touch sensor 301. The electrode 702, located outside the left side of the touch sensor 301, extends along the edge of the left side of the touch sensor 301. The electrode 703, located outside the right side of the touch sensor 301, extends along the edge of the right side of the touch sensor 301. The description of the electrode 602 may refer to the explanation of FIG. 5. The electrodes 702 and 703 partially overlap the plurality of traces 305 on the upper surface of the substrate 308. Each of the electrodes 701~703 has a shape of a strip and the same width. The widths of the electrodes 701, 702, 703, and 602 may be designed according to the width of the bezel. In an embodiment, each of the electrodes 701, 702, 703, and 602 has a width of 125~175 μm. The functions and control of the electrode 701~703 and 602 may refer to the related description of the electrodes 401~404, which will not be described in detail here.

Figure 7:
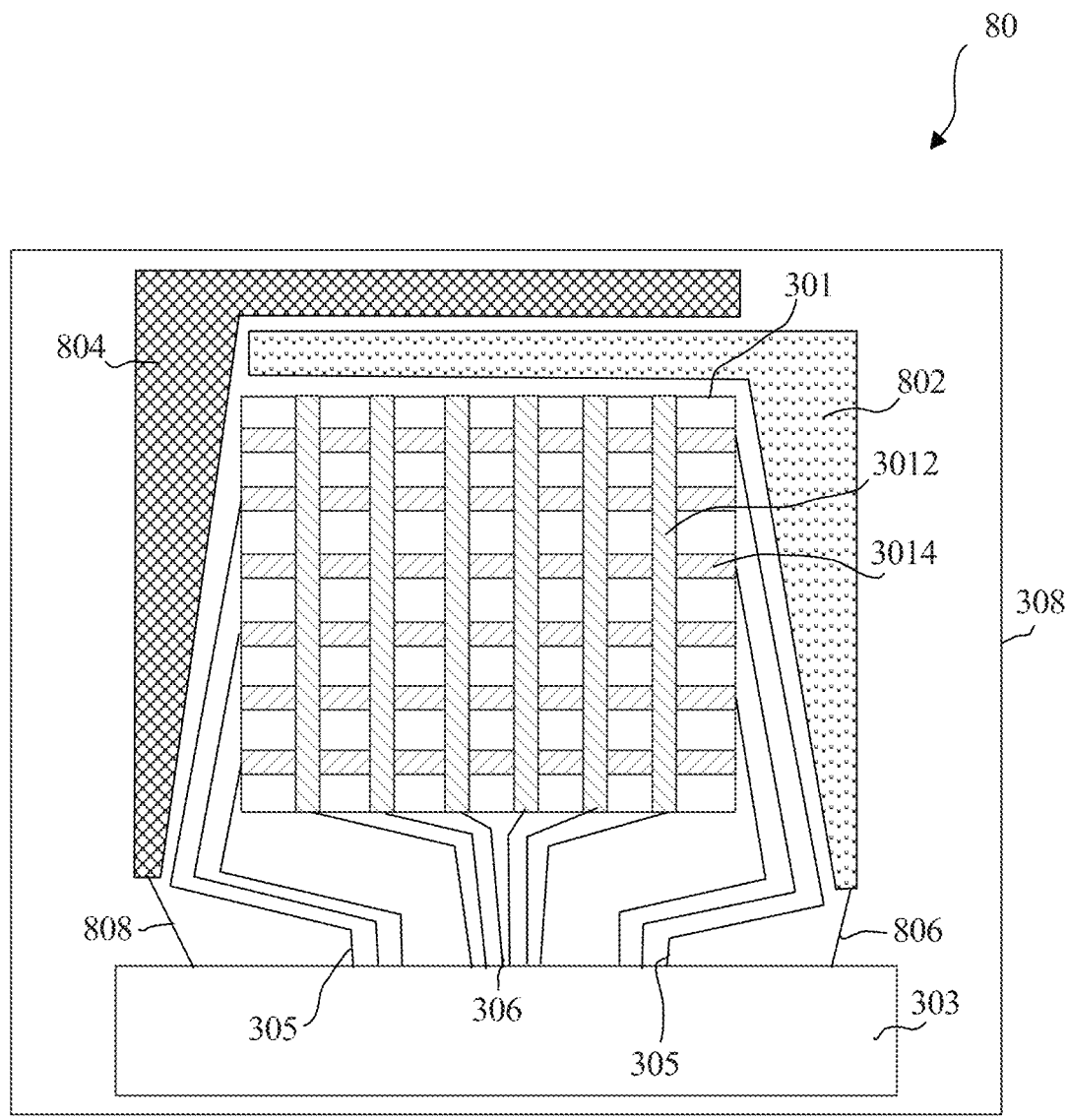
FIG. 7 shows a sixth embodiment of a touch device of the present invention.

FIG. 7 shows a sixth embodiment of a touch device of the present invention. A touch device 80 of FIG. 7 is different from the touch device of FIG. 2 in that the auxiliary electrode configuration of the touch device 80 includes an electrode 802 and an electrode 804. The electrode 802 and the electrode 804 are located on the upper surface of the substrate 308. The electrodes 802 and 804 and the touch sensor 301 are implemented with the same conduction layer of the substrate 308. The electrode 802 and the electrode 804 are respectively coupled to the controller 303 through traces 806 and 808. The electrode 802, located outside the right side and the upper side of the touch sensor 301, extends along the edges of the right side and the upper side of the touch sensor 301. The electrode 804, located outside the left side and the upper side of the touch sensor 301, extends along the edges of the left side of the touch sensor 301 and an outer side of the electrode 802. In order to dodge the plurality of traces 305, the part of the electrode 802 outside the right side of the touch sensor 301 has a shape that is narrower at a lower side thereof and wider at an upper side thereof. In order to dodge the plurality of traces 305, the part of the electrode 804 outside the left side of the touch sensor 301 has a shape that is narrower at a lower side thereof and wider at an upper side thereof. The electrodes 802 and 804 may be configured to transmit uplink signals and/or receive downlink signals. In an embodiment, the controller 303 simultaneously transmits uplink signals to the electrodes 802 and 804 and at least one of the plurality of sensing electrodes 3012 and 3014. The electrodes 802 and 804 are further configured to determine the location of the stylus 20. In an embodiment, when the electrodes 802 and 804 receive downlink signals, the controller 303 can determine that the stylus 20 moves from which side of the bezel to the touch sensor 301 according to the sensing values of the electrodes 802 and 804. For example, when the controller 303 detects that the electrode 802 has a sensing value and the electrode 804 has no sensing value, the controller 303 can determine that the stylus 20 is close to the right side of the touch sensor 301 and select at least one sensing electrode close to the right side to transmit the uplink signal. When the controller 303 detects that the electrodes 802 and 804 have sensing value, the controller 303 can determine that the stylus 20 is close to the upper side of the touch sensor 301.

In the embodiment of FIG. 7, the upper part of the electrode 802 is closer to the upper side of the touch sensor 301, and the upper part of the electrode 804 is located outside the upper part of the electrode 802. In other embodiments, the upper part of the electrode 804 may be closer to the upper side of the touch sensor 301, and the upper part of the electrode 802 may be located outside the upper part of the electrode 804. The widths of the electrodes 802 and 804 may be designed according to the width of the bezel. In an embodiment, each of the electrodes 802 and 804 has a width of 125~175 μm.

Figure 8:
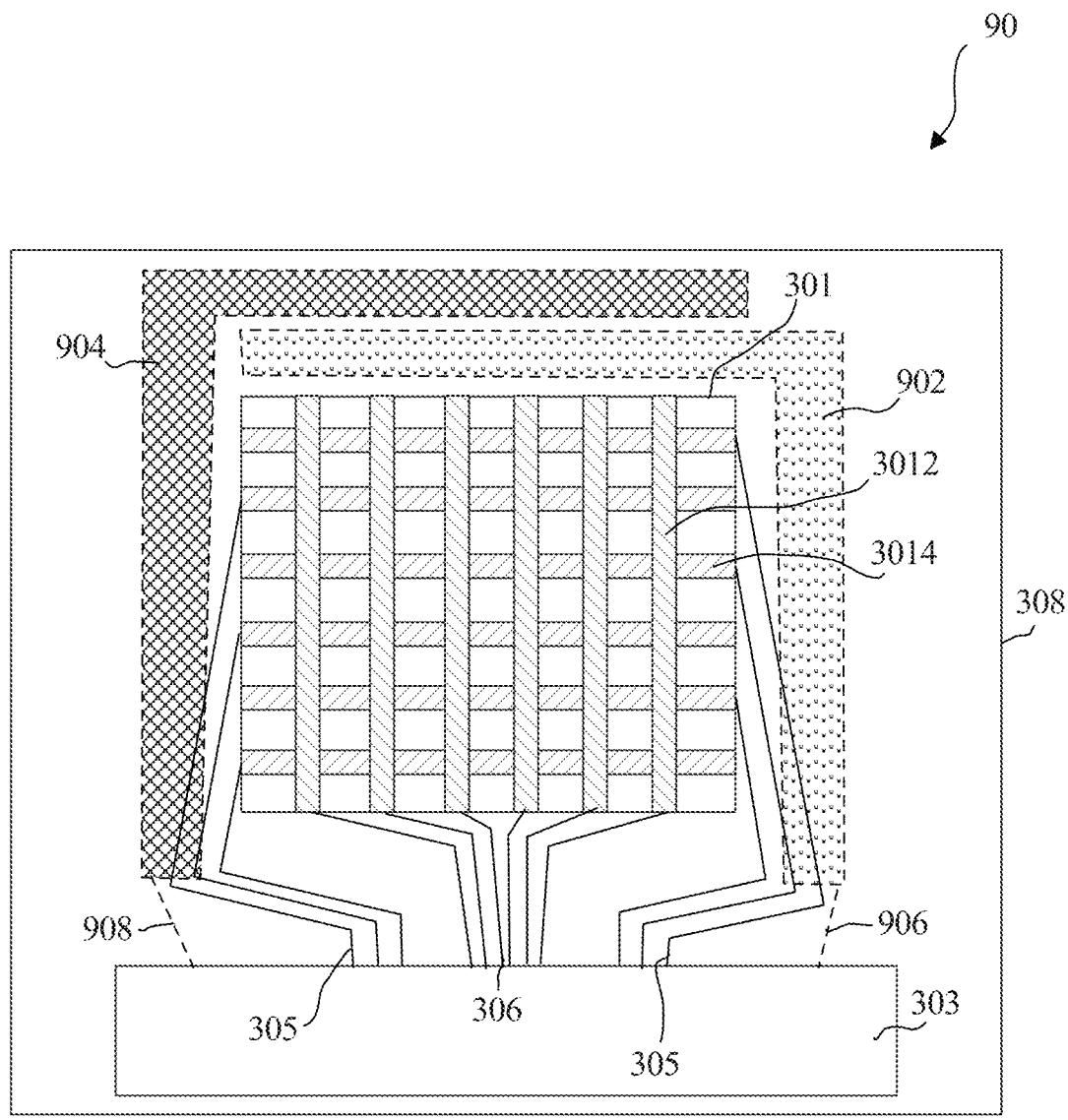
FIG. 8 shows a seventh embodiment of a touch device of the present invention.

FIG. 8 shows a seventh embodiment of a touch device of the present invention. A touch device 90 of FIG. 8 is different from the touch device of FIG. 7 in that the auxiliary electrode configuration of the touch device 90 includes electrode 902 and 904. The electrodes 902 and 904, which are different from the electrodes 802 and 804, are located on the lower surface of the substrate 308 and respectively coupled to the controller 303 through traces 906 and 908. The electrode 902, located outside the right side and the upper side of the touch sensor 301, extends along the edges of the right side and the upper side of the touch sensor 301. The electrode 904, located outside the left side and the upper side of the touch sensor 301, extends along the edge of the left side of the touch sensor 301 and an outside of the electrode 902. Compared with the electrodes 802 and 804 in FIG. 7, each of the electrodes 902 and 904 has a uniform width. In addition, the part of the electrode 902 on the right side of the touch sensor 301 and the part of the electrode 904 on the left side of the touch sensor 301 are closer to the touch sensor 301 and partially overlapped with the plurality of traces 305 on the upper surface of the substrate 308. The application and control of the electrodes 902 and 904 may refer to the description of the electrodes 802 and 804, which will not be described in detail here.

In the embodiment of FIG. 8, the upper part of the electrode 902 is closer to the upper side of the touch sensor 301, and the upper part of the electrode 904 is located outside the upper part of the electrode 902. In other embodiments, the upper part of the electrode 904 may be closer to the upper side of the touch sensor 301, and the upper part of the electrode 902 may be located outside the upper part of the electrode 904. The widths of the electrodes 902 and 904 may be designed according to the width of the bezel. In an embodiment, each of the electrodes 902 and 904 has a width of 125~175 μm.

In the foregoing embodiments, the electrodes and the traces on the upper surface of the substrate 308 may be implemented with the upper conduction layer of the substrate 308, and the electrodes and the traces on the lower surface of the substrate 308 may be implemented with the lower conduction layer of the substrate 308. In an embodiment, the electrode of the auxiliary electrode configuration has a width of 125~175 μm. It is also possible to combine the foregoing embodiments. For example, the traces 306 and electrodes 602 of FIG. 5 can be applied to the embodiments of other drawings.

Figure 9:
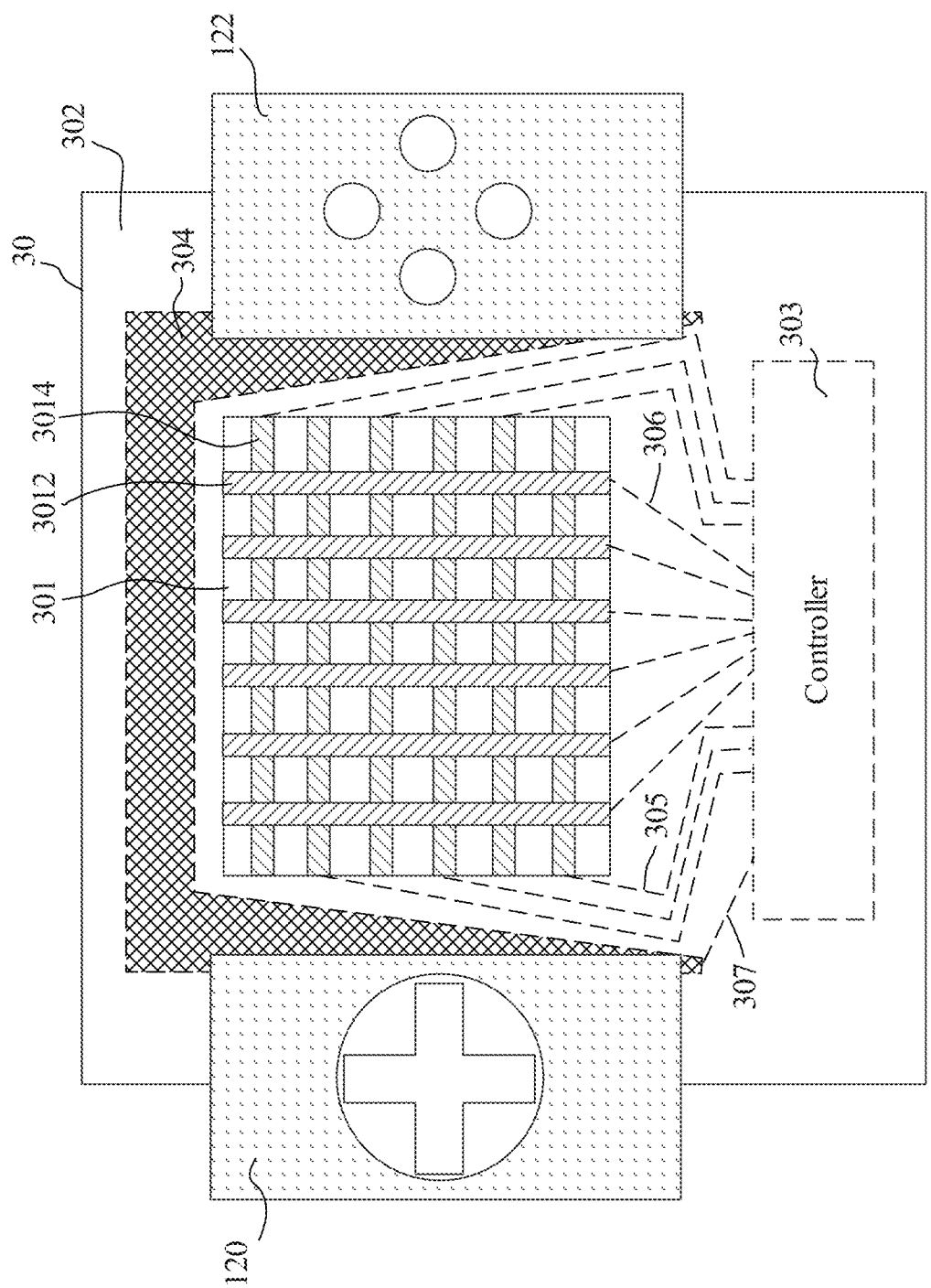
FIG. 9 shows a control system using the touch device of the present invention.

FIG. 9 shows a control system using the touch device of the present invention. The control system of FIG. 9 includes the touch device 30 of FIG. 2 and control devices 120 and 122. The control device 120 is engaged with the left side of a bezel 302 of the touch device 30. The control device 122 is fastened with the right side of the bezel 302 of the touch device 30. The control devices 120 and 122 may be, but not limited to, joysticks. In FIG. 9, the controller 303, the electrode 304, and the traces 305~307 are located under the bezel 302 and represented by dashed lines. The touch device 30 may transmit uplink signals to the control devices 120 and 122 through the sensing electrodes 3012 and 3014 and the electrode 304 (i.e., the auxiliary electrode configuration). After the sensing electrodes (not shown) of the control devices 120 and 122 receive the uplink signals, the control devices 120 and 122 can activate communication functions to communicate with the touch device 30. The communication function includes, but not limited to, Bluetooth communication. Since the electrode 304 of the touch device 30 is closer to the sensing electrodes of the control devices 120 and 122 than the sensing electrodes 3012 and 3014, thus the mutual capacitance value between the electrode 304 and the sensing electrodes of the control devices 120 and 122 would be larger and thereby providing the more stable communication quality between the touch device 30 and each of the control devices 120 and 122. Alternatively, the touch device 30 in FIG. 9 may be replaced with the touch device 40, 50, 60, 70, 80, or 90 of the present invention.

In the embodiments provided above, the controller is located on the substrate of the touch sensor and located on the lower side of the touch sensor, but the present invention is not limited thereto. In other embodiments, the controller may be located on another flexible circuit board and coupled to the substrate.

In the embodiments provided above, the touch sensor 301 is located on an upper surface of the substrate 308, but the present invention is not limited thereto. In other embodiments, the touch sensor 301 may be located on an upper surface and a lower surface of the substrate 308 or located on different substrates. For example, the sensing electrodes 3012 of the touch sensor 301 are arranged on the upper surface of the substrate 308 and the sensing electrodes 3014 are arranged on the lower surface of the substrate 308. For example, the sensing electrodes 3012 of the touch sensor 301 are arranged on the substrate 308 and the sensing electrodes 3014 are arranged on another substrate which is overlap with the substrate 308.

The embodiments described above are only to exemplify the present invention but not to limit the scope of the present invention. Therefore, any equivalent modification or variation according to the shapes, structures, features, or spirit disclosed by the present invention is to be also included within the scope of the present invention.

What is claimed is:

1. A touch device comprising:
 a substrate;
 a touch sensor located on an upper surface of the substrate; and
 an auxiliary electrode configuration located outside the touch sensor and configured to transmit an uplink signal,
 wherein the uplink signal is used to communicate with a stylus so as to pair the touch device with the stylus, and
 wherein the touch sensor and the auxiliary electrode configuration are configured to transmit the uplink signal simultaneously.

2. The touch device according to claim 1, further comprising a bezel, the bezel surrounds the touch sensor and covers the auxiliary electrode configuration, and the bezel allows the uplink signal to pass.

3. The touch device according to claim 1, wherein the auxiliary electrode configuration comprises:
 an electrode, located on the upper surface of the substrate, extending along edges of a first side, a second side, and a third side of the touch sensor;
 wherein each of two parts of the electrode respectively outside the second side and the third side of the touch sensor has a shape which is narrower at a lower side thereof and wider at an upper side thereof;
 wherein the second side is opposite to the third side, and the first side is adjacent to the second side and the third side.

4. The touch device according to claim 1, wherein the auxiliary electrode configuration comprises:
- a first electrode, located outside a first side of the touch sensor, extending along an edge of the first side of the touch sensor;
- two second electrodes, located outside a second side of the touch sensor, respectively extending to two ends of the second side of the touch sensor;
- a third electrode, located outside a third side of the touch sensor, extending along an edge of the third side of the touch sensor; and
- a fourth electrode, located outside a fourth side of the touch sensor, extending along an edge of the fourth side of the touch sensor;
- wherein a shape of each of the third electrode and the fourth electrode is narrower at a lower side thereof and wider at an upper side thereof;
- wherein the first side is opposite to the second side, the third side is opposite to the fourth side, the first side is adjacent to the third side and the fourth side, and the second side is adjacent to the third side and the fourth side.

5. The touch device according to claim 1, wherein the auxiliary electrode configuration comprises:
- an electrode, located on a lower surface of the substrate, extending along edges of a first side, a second side, and a third side of the touch sensor;
- wherein the second side is opposite to the third side, and the first side is adjacent to the second side and the third side.

6. The touch device according to claim 1, wherein the auxiliary electrode configuration comprises:
- a first electrode, located on a lower surface of the substrate and located outside a first side of the touch sensor, extending along an edge of the first side of the touch sensor;
- a second electrode, located on the lower surface of the substrate and located outside a second side of the touch sensor, extending along an edge of the second side of the touch sensor; and
- a third electrode, located on the lower surface of the substrate and located outside a third side of the touch sensor, extending along an edge of the third side of the touch sensor;
- wherein the second side is opposite to the third side, and the first side is adjacent to the second side and the third side.

7. The touch device according to claim 1, wherein the auxiliary electrode configuration comprises:
- a first electrode, located on the upper surface of the substrate and located outside a first side and a second side of the touch sensor, extending along edges of the first side and the second side of the touch sensor; and
- a second electrode, located on the upper surface of the substrate and located outside a third side and the first side of the touch sensor, extending along an edge of the third side of the touch sensor and an outer side of the first electrode;
- wherein a part of the first electrode outside the second side of the touch sensor has a shape that is narrower at a lower side thereof and wider at an upper side thereof, and a part of the second electrode outside the third side of the touch sensor has a shape that is narrower at a lower side thereof and wider at an upper side thereof;
- wherein the second side is opposite to the third side, and the first side is adjacent to the second side and the third side.

8. The touch device according to claim 1, wherein the auxiliary electrode configuration comprises:
- a first electrode, located on a lower surface of the substrate and located outside a first side and a second side of the touch sensor, extending along edges of the first side and the second side of the touch sensor; and
- a second electrode, located on the lower surface of the substrate and located outside a third side and the first side of the touch sensor, extending along an edge of the third side of the touch sensor and an outer side of the first electrode;
- wherein the second side is opposite to the third side, and the first side is adjacent to the second side and the third side.

9. The touch device according to one of claim 5, wherein a region outside a fourth side of the touch sensor on the upper surface of the substrate comprises a metal mesh, a part of the metal mesh forms another electrode of the auxiliary electrode configuration, and another part of the metal mesh is coupled to a grounding terminal, wherein the first side is opposite to the fourth side, and the fourth side is adjacent to the second side and the third side.

10. The touch device according to one of claim 6, wherein a region outside a fourth side of the touch sensor on the upper surface of the substrate comprises a metal mesh, a part of the metal mesh forms another electrode of the auxiliary electrode configuration, and another part of the metal mesh is coupled to a grounding terminal, wherein the first side is opposite to the fourth side, and the fourth side is adjacent to the second side and the third side.

11. The touch device according to one of claim 7, wherein a region outside a fourth side of the touch sensor on the upper surface of the substrate comprises a metal mesh, a part of the metal mesh forms another electrode of the auxiliary electrode configuration, and another part of the metal mesh is coupled to a grounding terminal, wherein the first side is opposite to the fourth side, and the fourth side is adjacent to the second side and the third side.

12. The touch device according to one of claim 8, wherein a region outside a fourth side of the touch sensor on the upper surface of the substrate comprises a metal mesh, a part of the metal mesh forms another electrode of the auxiliary electrode configuration, and another part of the metal mesh is coupled to a grounding terminal, wherein the first side is opposite to the fourth side, and the fourth side is adjacent to the second side and the third side.

13. The touch device according to claim 4, wherein the touch sensor and the auxiliary electrode configuration are coupled to a controller and further configured to receive a downlink signal transmitted by a stylus, and the controller is configured to compute a location of the stylus according to sensing values of the auxiliary electrode configuration and the touch sensor.

14. The touch device according to claim 6, wherein the touch sensor and the auxiliary electrode configuration are coupled to a controller and further configured to receive a downlink signal transmitted by a stylus, and the controller is configured to compute a location of the stylus according to sensing values of the auxiliary electrode configuration and the touch sensor.

15. The touch device according to claim 4, wherein the touch sensor and the auxiliary electrode configuration are coupled to a controller and further configured to receive a downlink signal transmitted by a stylus, and the controller is configured to determine a side of the touch sensor close to the stylus according to sensing values of the auxiliary electrode configuration and the touch sensor, thereby selecting at least one electrode of the touch sensor to transmit the uplink signal.

16. The touch device according to claim 6, wherein the touch sensor and the auxiliary electrode configuration are coupled to a controller and further configured to receive a downlink signal transmitted by a stylus, and the controller is configured to determine a side of the touch sensor close to the stylus according to sensing values of the auxiliary electrode configuration and the touch sensor, thereby selecting at least one electrode of the touch sensor to transmit the uplink signal.

17. The touch device according to claim 7, wherein the touch sensor and the auxiliary electrode configuration are coupled to a controller and further configured to receive a downlink signal transmitted by a stylus, and the controller is configured to determine a side of the touch sensor close to the stylus according to sensing values of the auxiliary electrode configuration and the touch sensor, thereby selecting at least one electrode of the touch sensor to transmit the uplink signal.

18. The touch device according to claim 8, wherein the touch sensor and the auxiliary electrode configuration are coupled to a controller and further configured to receive a downlink signal transmitted by a stylus, and the controller is configured to determine a side of the touch sensor close to the stylus according to sensing values of the auxiliary electrode configuration and the touch sensor, thereby selecting at least one electrode of the touch sensor to transmit the uplink signal.

19. A control system comprising:
a touch device comprising:
a substrate;
a touch sensor located on an upper surface of the substrate;
a bezel surrounding the touch sensor and allowing an uplink signal to pass; and
an auxiliary electrode configuration located outside the touch sensor, covered by the bezel, and configured to transmit the uplink signal; and
a control device fastened with the bezel, wherein the control device activates a communication function to communicate with the touch device when receiving the uplink signal.

20. The control system according to claim 19, wherein the control device comprises a joystick.

21. The control system according to claim 19, wherein the communication function comprises Bluetooth communication.

22. The control system according to claim 19, wherein the auxiliary electrode configuration comprises:
an electrode, located on a lower surface of the substrate, extending along edges of a first side, a second side, and a third side of the touch sensor;
wherein the second side is opposite to the third side and the first side is adjacent to the second side and the third side.

23. The control system according to claim 19, wherein the auxiliary electrode configuration comprises:
a first electrode, located on a lower surface of the substrate and located outside a first side of the touch sensor, extending along an edge of the first side of the touch sensor;
a second electrode, located on a lower surface of the substrate and located outside a second side of the touch sensor, extending along an edge of the second side of the touch sensor; and
a third electrode, located on a lower surface of the substrate and located outside a third side of the touch sensor, extending along an edge of the third side of the touch sensor;
wherein the second side is opposite to the third side, and the first side is adjacent to the second side and the third side.

24. The control system according to claim 22, wherein a region outside a fourth side of the touch sensor on an upper surface of the substrate comprises a metal mesh, a part of the metal mesh forms another electrode of the auxiliary electrode configuration, and another part of the metal mesh is coupled to a grounding terminal, wherein the first side is opposite to the fourth side, and the fourth side is adjacent to the second side and the third side.

25. The control system according to claim 23, wherein a region outside a fourth side of the touch sensor on an upper surface of the substrate comprises a metal mesh, a part of the metal mesh forms another electrode of the auxiliary electrode configuration, and another part of the metal mesh is coupled to a grounding terminal, wherein the first side is opposite to the fourth side, and the fourth side is adjacent to the second side and the third side.

* * * * *